(No Model.)
G. A. & C. F. FLEMING.
FRUIT GATHERER.
No. 389,697. Patented Sept. 18, 1888.
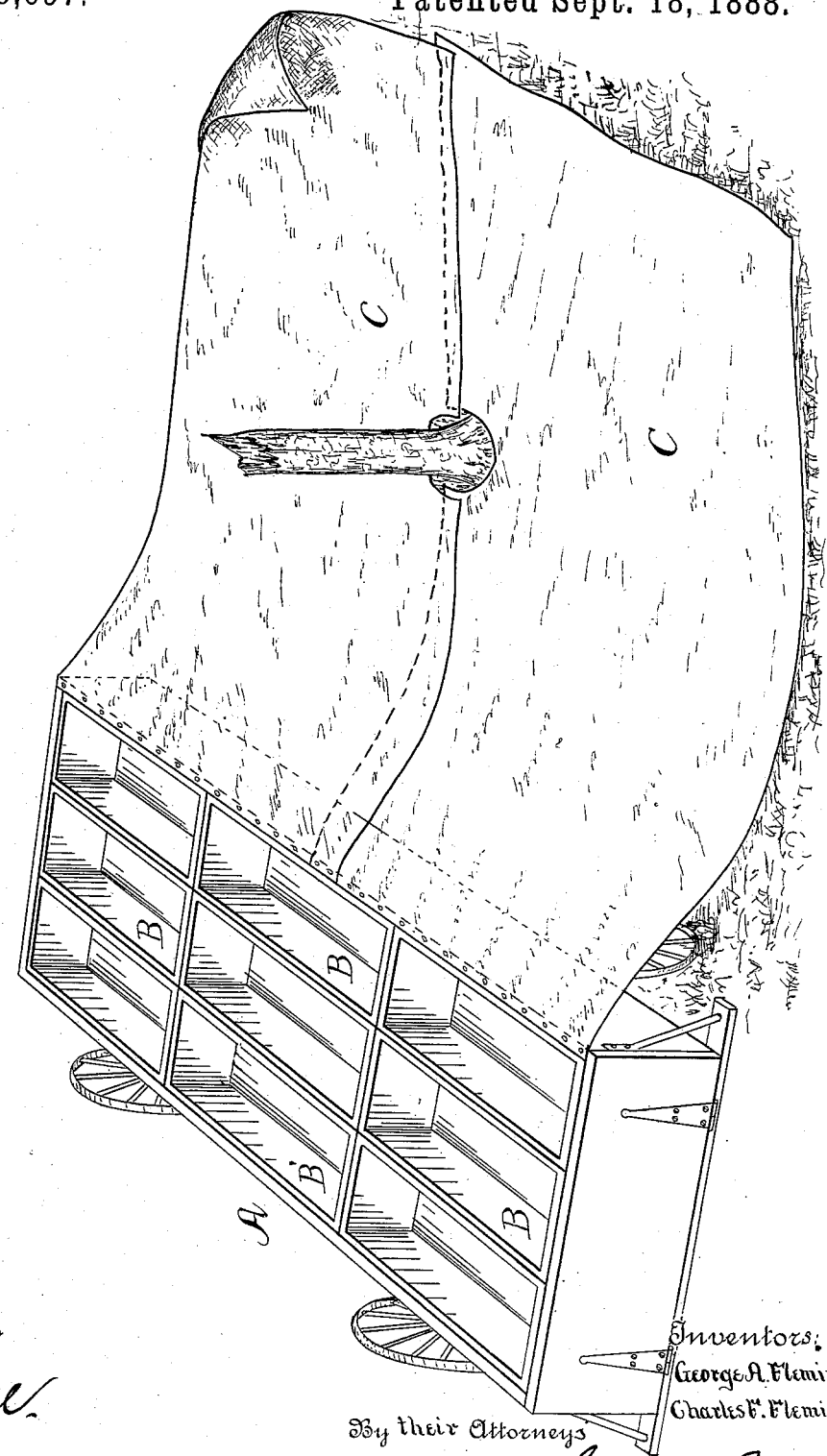
Witnesses
Inventors:
George A. Fleming
Charles F. Fleming
By their Attorneys
Soulé & Co.

United States Patent Office.

GEORGE A. FLEMING AND CHARLES F. FLEMING, OF SAN JOSÉ, CALIFORNIA.

FRUIT-GATHERER.

SPECIFICATION forming part of Letters Patent No. 389,697, dated September 18, 1888.

Application filed August 5, 1886. Serial No. 210,072. (No model.)

*To all whom it may concern:*

Be it known that we, GEORGE A. FLEMING and CHARLES F. FLEMING, citizens of the United States, residing at San José, in the county of Santa Clara and State of California, have invented certain new and useful Improvements in Fruit-Gatherers; and we do declare the following to be a full, clear, and exact description of the invention, such as will enable others skilled in the art to which it appertains to make and use the same, reference being had to the accompanying drawing, and to the letters and figures of reference marked thereon, which forms a part of this specification.

This invention is designed for gathering fruit growing upon trees—such as prunes, for example—in an economical and expeditious manner.

To this end the invention consists in a wheeled truck, wagon, or sled, which may or may not be provided with packing-boxes for the fruit, to which truck gathering-cloths are permanently secured. These cloths are attached to one side of the truck, and are adapted to be spread beneath the tree from which the fruit is to be gathered. There are two of these cloths, so that they may be spread on both sides of the trunk of the tree. When spread beneath the tree, the tree is shaken and the fruit falls upon the cloths, and when all the fruit is shaken from the tree the free ends of the cloth are lifted higher than the edge of the truck, thus permitting the fruit to fall into the truck or the packing-boxes contained therein. The truck is then moved to the next tree, the cloths are respread, and so on until the gathering is completed or the truck full. When not spread beneath the trees, the cloths are laid across the top of the truck, thus protecting the fruit from dust, &c. This invention being particularly designed for gathering prunes, the cloths are laid directly on the ground, the prunes not being injured by falling on the ground.

The invention is illustrated in the accompanying drawing, which is a perspective view of my invention in position for use.

A is the truck or wagon, which has a box-shaped body. It is shown as filled with open packing-boxes B B.

C C are the cloths, attached to the upper edge of one side of the body of the truck. Each cloth has at its center and in adjacent edges a semicircular recess, which enables the cloths to fit around the trunk of a tree.

We are aware that it is not new to gather fruit by laying cloths beneath the tree and shaking the fruit, so as to permit it to fall therein, nor is it new to use cloths which are held beneath the tree out of contact with the ground by means of suitable frames. We are also aware that it is not new to provide a wagon or truck with a projecting frame on which is stretched a cloth which conducts the fruit to the body of the wagon or truck. None of these arrangements fulfill the object of our invention, which is to provide a truck, wagon, or sled which shall be of an ordinary or simple construction, and take no additional room when being moved about, to which truck are permanently attached gathering-cloths, which, when not in use, may be spread upon the top of the fruit in the trucks, thus protecting the same.

We claim as our invention—

A fruit-gathering truck, wagon, or sled having a box-shaped body and open packing-boxes carried by and in said body, in combination with two parallel gathering-cloths permanently attached at one edge alongside each other to the upper edge of one side of said body and having semicircular recesses in their adjacent edges, whereby they are adapted to be spread around and beneath a tree to receive the falling fruit and to be raised to direct the same into said receptacles, substantially as herein described.

In testimony whereof we affix our signatures in presence of two witnesses.

GEO. A. FLEMING.
CHAS. F. FLEMING.

Witnesses:
D. D. TENNYSON,
J. H. RUSSELL.